(No Model.)

G. McGOVERN.
KEY HOLE GUARD.

No. 307,403. Patented Oct. 28, 1884.

WITNESSES
Chas H Baker
Frank Lindmus.

INVENTOR
George McGovern.

H. Tunis Attorney

UNITED STATES PATENT OFFICE.

GEORGE McGOVERN, OF RICHMOND, VIRGINIA.

KEY-HOLE GUARD.

SPECIFICATION forming part of Letters Patent No. 307,403, dated October 28, 1884.

Application filed March 24, 1884. (No model.)

*To all whom it may concern:*

Be it known that I, GEORGE MCGOVERN, a citizen of the United States, residing at Richmond, in the county of Henrico and State of Virginia, have invented certain new and useful Improvements in Key-Hole Guards, of which the following is a specification, reference being had therein to the accompanying drawings.

My invention has relation to key-hole guards, and the object is to provide a device to be inserted in the key-hole after the door has been locked and the key withdrawn, which will prevent the insertion of a key or pick from the outside; and to this end the novelty consists in the construction of the same, as will be hereinafter more fully described, and particularly pointed out in the claims.

In the accompanying drawings similar letters of reference indicate the same parts of the invention.

Figure 1:
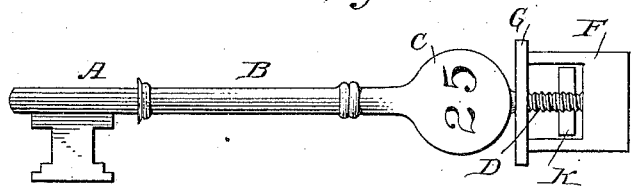
Figure 2:
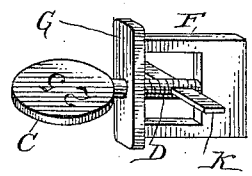

Figure 1 is a plan view of the key-hole guard and key combined. Fig. 2 is a detached perspective of the guard in position when inserted in the lock, and Fig. 3 a longitudinal section of the same.

A is the key, having shank B and handle C, having the usual room-number stamped thereon.

D is a stud formed integral with the handle C, and screw-threaded to the shoulder c, while its end is diminished in size, so as to form a pin, E.

F is a rectangular frame, having an enlarged flange, G, which covers the key-hole when the frame is inserted. The stud D passes through a hole, H, in the flange G, said hole being screw-threaded to correspond to said stud, and I is a smaller hole in the frame F, in line with the screw-thread hole H, into which the pin E enters.

Figure 3:
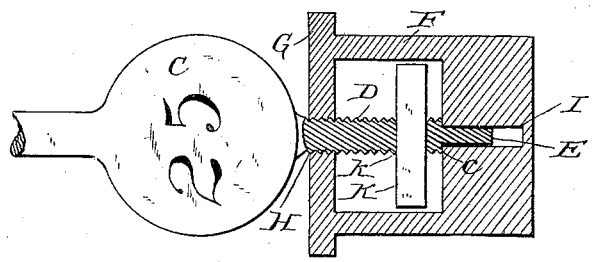

K is a bar rigidly secured in a slot, k, in the stud D, and when the stud D, handle C, and bar K are set as shown in Figs. 1 and 3, the frame F is inserted in the key-hole and the handle C turned crosswise or at a right angle to its former position. This throws the bar K at a right angle to the key-hole slot and prevents its withdrawal when the handle is turned, as shown in Fig. 2. The shoulder c is hard against the end of the hole I by means of the screw-threads on the stud D, and consequently rigidly locked in place, making it impossible to remove or release it from the front side of the door.

I have in this case shown my improved guard formed integral with an ordinary hotel-room key, and after the guest has locked the door he has only to withdraw the key and insert the guard and turn it so as to lock it therein.

Having thus fully described my invention, what I claim as new and useful, and desire to secure by Letters Patent of the United States, is—

1. The combination, with the key A B, having its handle C provided with the screw-threaded stud D, made integral therewith, and having the bar K secured thereto, of the frame F, arranged upon said stud, and provided with flange G, as and for the purpose set forth.

2. The combination, with the handle C, screw-threaded stud D, and pin E, made in one piece, of the frame F, having holes H and I, and the bar K, as and for the purpose set forth.

In testimony whereof I affix my signature in presence of two witnesses.

GEORGE McGOVERN.

Witnesses:
CHAS. H. BAKER,
H. J. ENNIS.